United States Patent [19]

Tsuji et al.

[11] Patent Number: 5,759,693
[45] Date of Patent: Jun. 2, 1998

[54] LAMINATE

[75] Inventors: Hiroyuki Tsuji; Shoji Hara; Hirosaku Nagano, all of Otsu, Japan

[73] Assignee: Kanegafuchi Kagaku Kogyo Kabushiki Kaisha, Osaka, Japan

[21] Appl. No.: 811,366

[22] Filed: Mar. 10, 1997

Related U.S. Application Data

[63] Continuation-in-part of Ser. No. 586,464, Jan. 11, 1996, Pat. No. 5,641,852.

[30] Foreign Application Priority Data

Jan. 11, 1995 [JP] Japan ................. 7-019657

[51] Int. Cl.$^6$ ............................ B32B 27/38; B32B 15/08
[52] U.S. Cl. .................... 428/413; 428/418; 428/473.5
[58] Field of Search ......................... 428/413, 418, 428/473.5

[56] References Cited

U.S. PATENT DOCUMENTS

| | | | |
|---|---|---|---|
| 3,491,060 | 1/1970 | Schminke et al. | 260/47 |
| 5,350,635 | 9/1994 | Pokorny | 428/414 |
| 5,442,039 | 8/1995 | Hefner, Jr. et al. | 528/422 |

*Primary Examiner*—Frederick Krass
*Attorney, Agent, or Firm*—Armstrong, Westerman, Hattori, McLeland & Naughton

[57] ABSTRACT

The object of the invention is to solve a problem of bending of laminate caused by hardening contraction of epoxy resin that has been a subject in laminate used conventional epoxy resinous composition in laminate of two or more than two layers used for electric and electronic parts, and to provide a novel laminate obtaining excellent adhesive property and heat resistant property, and exhibiting no bending. The inventive laminate achieving the above object comprises laminating at least the following two components (a) and (b): (a) resin composition comprising thermosetting resin composed of imide carbonate synthesized by reacting cyanate resin and compound which containing at least 1 or more than 1 phenolic hydroxyl, and epoxy resin (b) heat resistant resin obtaining glass transition temperature of 150° C. or more than 150° C. and thermal expansion coefficient of 0.4 to $3.8 \times 10^{-5}$ cm/cm/°C. at the temperature of 20° (ordinary temperature) to 150° C. The inventive thermosetting resin composition has been consummated by converting cyanate resin into imide carbonate under the presence of epoxy resin.

4 Claims, No Drawings

LAMINATE

This application is a continuation-in-part of application Ser. No. 08/586,464, filed Jan. 11, 1996, now U.S. Pat. No. 5,641,852.

BACKGROUND OF THE INVENTION

The present invention relates to laminate that can be used for sealing resin used for substrates for mounting electronic parts, solder resist, housing material resin for electric and electronic apparatuses, and the like which are requiring low hardening contraction rate.

Recently, relative to down-sizing and thinning of electric and electronic parts, circuit structure has also been thinned. However, varied dimensions of built-in parts may incur unwanted failure such as disconnection or short circuit against extremely thinned circuit structure. Thus, highly precise dimensional stability is required for such material used for electric and electronic parts, and as a result, in the laminate used for the above material a greater amount of epoxy resinous thermosetting resin has been used for such thermosetting resin composition which is a component of the laminate.

Epoxy resinous thermosetting resin is basically composed of epoxy resin and an epoxy resin hardening agent. Amines, acid anhydrides, polyamides, imidazoles or isocyanates are used for the epoxy resin hardening agent.

Hardening of epoxy resin is promoted by effect of link-breakage reaction of epoxy link generated by the above-cited epoxy resin hardening agent. Incidentally, since molecules of hardened epoxy resin contain polar hydroxyl radical and ether union, hardened epoxy resin exerts distinguished adhesion to other material with substantial adhesive strength. In addition, hardened epoxy resin also contains outstanding heat resistant property and features less hardening contraction than other thermosetting resins. Nevertheless, even though hardened epoxy resin incurs less hardening contraction than other thermosetting resin, since hardening contraction may be the cause of generating crack inside of hardened epoxy resin or deformation of adhered object, hardened epoxy resin is not suited for such uses requiring highly precise dimensional stability. As a method to deal with such problem caused by hardening contraction of thermosetting resin, filler material is blended in resin. However, this method not only causes smoothness on the surface of resin to be spoiled by blended filler material, but it may also cause proper strength of resin to be lowered. On the other hand, since hardening contraction cannot fully be offset by means of content of filler material within scope of maintaining strength of resin, such problem caused by hardening contraction of thermosetting resin has not yet been solved.

To deal with the above-referred problem caused by hardening contraction of thermosetting resin remaining unsettled in the use of epoxy resin or filler-blended epoxy resin, such a method to solve the above problem by introducing thermosetting resin such as cyanate resin having property to generate expansion via hardening has been conceived. Concretely, this method makes up thermosetting resinous component by means of cyanate resin only, or a blend comprising cyanate resin and a compound including at least one or more than one of phenolic hydroxyl radical or a blend comprising cyanate resin and epoxy resin.

Nevertheless, even when introducing one of the above constituent compositions of thermosetting resin, the following problem is generated. Concretely, when introducing constituent composition of the above cyanate resin alone, it is necessary to execute reaction at a high temperature close to 200° C. to fully terminate hardening of cyanate resin, and thus it is by no means suited for sealing resin or solder resist. On the other hand, when introducing such composition comprising cyanate resin and compound containing at least one or more than one of phenolic hydroxyl radical, although hardening of cyanate resin can be promoted at a temperature lower than the case of solely using cyanate resin, since the above composition is insufficient in adhesive strength, it is not suited for an adhesive agent.

On the other hand, another method is also conceived, which combines epoxy resin exerting strong adhesion with cyanate resin so that properties of both resins in the blend can properly be harmonized. This method can indeed provide a blend with outstanding heat resistant property and adhesive property. However, since cyanate resin also generates reaction with epoxy resin in addition to its own hardening reaction, it results in obstacle to hardening reaction of cyanate resin itself. In consequence, hardening expansion proper to cyanate resin cannot fully be exerted to result in diminished effect of including cyanate resin in constituent composition of thermosetting resin in anticipation of such property as exerting hardening expansion.

Under the above circumstances, in order to fully solve the above problems, the present inventors followed up researches to provide laminate capable of generating distinguished adhesive property, heat resistant property, negligible contraction via hardening, and contributing to achieve high dimensional stability before eventually consummating the invention.

BRIEF SUMMARY

The subject of laminate according to the present invention is that laminate comprises laminating at least the following two components.

(a) Resin composition comprising thermosetting resin composed of imide carbonate synthesized by reacting cyanate resin and a compound containing at least 1 or more than 1 phenolic hydroxyl, and epoxy resin.

(b) Heat resistant resin having a glass transition temperature of 150° C. or more than 150° C. and thermal expansion coefficient of 0.4 to $3.8 \times 10^{-5}$ cm/cm/°C. at the temperature of 20° (ordinary temperature) to 150° C.

Another subject of laminate according to the present invention is that said thermosetting resin composition is obtained by synthesizing imide carbonate by reacting cyanate resin and compound containing at least one or more than one of phenolic hydroxyl radical under the presence of epoxy resin.

Further, another subject of laminate of the present invention is that said thermosetting resin composition is obtained by that after synthesizing imide carbonate by reacting cyanate resin and compound containing at least one or more than one of phenolic hydroxyl radical under the presence of epoxy resin, epoxy resin is added to said imide carbonate.

DETAILED DESCRIPTION OF THE INVENTION

Essentially, the invention is characterized by laminating at least the two components: (a) thermosetting resin composition comprising imide carbonate synthesized by cyanate resin and compound which comprises at least 1 or more than 1 phenolic hydroxyl, and epoxy resin (b) heat resistant resin having a glass transition temperature of 150° C. or more than 150° C. and thermal expansion coefficient of 0.4 to 3.8×10⁻⁵ cm/cm/°C. at the temperature of 20° (ordinary temperature) to 150° C. In addition, said thermosetting resin composition obtains the following characteristics. That is, the invention is characterized by arrangement to sustain cyanate resin in the state of being converted into imide carbonate being intermediate of hardened object in the producing process followed by a step to harden thermosetting resin composition comprising blend of imide carbonate and epoxy resin to cause hardened objects to be generated individually from reactions respectively generated by cyanate resin and epoxy resin. By virtue of converting cyanate resin into imide carbonate, cyanate radical and epoxy radical can be prevented from reacting with each other, and thus respective thermosetting resin components can become hardened object via reaction between respective components. Accordingly, initiation of expansion of cyanate resin via hardening caused by reaction between cyanate radical and epoxy radical can be prevented from being obstructed.

In consequence, even when being blended with epoxy resin, it is possible to exert physical characteristic in terms of expansion via hardening proper to cyanate resin without being reduced. Accordingly, expansion of cyanate resin via hardening fully offsets contraction of epoxy resin via hardening to fully solve the problem caused by hardening contraction of thermosetting resin component which is a component of the laminate according to the present invention. In addition, as a result of introducing epoxy resin to compose the thermosetting resin component, it is possible to securely provide thermosetting resin composition featuring distinguished adhesive property and heat resistant property. Further, a laminate featuring distinguished adhesive property and heat resistant property can be obtained wherein said thermosetting resin composition is one component. Incidentally, after reaction with cyanate resin, reacted phenolic hydroxyl radical is regenerated relative the progress of the hardening reaction of cyanate resin to contribute to hardening of the epoxy resin.

Substantially, imide carbonate is an intermediate in the previous stage until generation of the cyanate-resin hardened object subsequent to reaction between cyanate resin and the compound comprising at least one or more than one of phenolic hydroxyl radical. Generation of the cyanate-resin hardened object via reaction between cyanate resin and the compound comprising at least one or more than one of phenolic hydroxyl radical can be achieved without presence of solvent. However, it is normally quite difficult to effectively discontinue said reaction as of imide-carbonate stage. When organic solvent is present, reaction can be hardly promoted between only cyanate resin and the compound comprising at least one or more than one of phenolic hydroxyl radical. In the thermosetting resin composition which is one component of the laminate according to the present invention, in order to prevent cyanate radical and epoxy radical from reacting with each other, it is essential that imide carbonate be synthesized and yet reaction be discontinued as of the state of imide carbonate. Means for synthesizing imide carbonate is described below.

When organic solvent is present, by effect of adding epoxy resin to cyanate resin and compound comprising at least one or more than one of phenolic hydroxyl radical, reaction between cyanate resin and said compound comprising at least one or more than one of phenolic hydroxyl radical is effectively promoted to eventually yield imide carbonate. After confirming dissipation of cyanate radical, solvent is added to lower the density of the generated object so that reaction can be discontinued as of the stage of generating imide carbonate. Dissipation of cyanate radical can be detected via conventional analytical means such as infrared absorbent spectrometer or the like. While the above reaction is underway, epoxy resin substantially remains without generating chemical variation, but instead, it functions as a catalyzer for generating imide carbonate. In addition, while the above reaction is underway, epoxy resin is free from generating reaction with cyanate radicals without impeding the hardening reaction between respective cyanate radicals.

Reaction for generating imide carbonate under presence of organic solvent can be promoted at normal temperature. It is also possible to contract reaction time by raising reaction temperature by applying a solvent having higher boiling point. However, if reaction is promoted too fast, reaction can hardly be controlled (discontinued), and thus, it is desired that reaction be promoted at 20° C.~150° C. Reaction is executed until whole cyanate radicals are converted into imide carbonate. Although depending on reaction temperature, normally, reaction should be executed for an hour through 20 consecutive hours.

After confirming that whole cyanate radicals have been converted into imide carbonate via the above reaction for synthesizing imide carbonate, heating is discontinued and then organic solvent is added to the reacted product to lower the density thereof before stopping the reaction. If the reaction is promoted too much, reacted product cannot easily be dissolved in organic solvent, and thus, it is essential that the reaction be stopped simultaneously with dissipation of cyanate radicals. Degree of reaction for generating imide carbonate can be evaluated via infrared absorbent spectrometer.

Then, in order to provide a thermosetting resin composition with heat resistant property and adhesive property, epoxy resin is added to the yielded imide carbonate. Next, the blend is properly diluted by adding solvent thereto and then sufficiently stirred to eventually complete the thermosetting resin composition which is one component of the laminate related to the invention.

As cyanate resin, it is desired that monomer derivative aromatic cyanate resin represented by general formula (1) be introduced.

General formula (1):

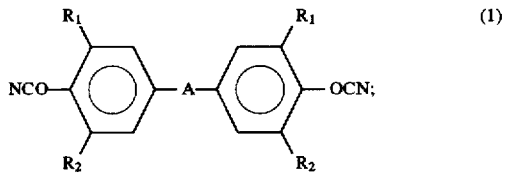

(1)

wherein $R_1$ and $R_2$ respectively designate monovalent substituent and A divalent bonding radical (including monounion).

In particular, in order to effectuate hardening expansion, it is preferred that aromatic cyanate resin represented by general formula (1) be used in a scope of 50% or less than 50% and in oligomerized condition, i.e., in the state in which cyanate radical of 50% or less than 50% of all the cyanate radicals is used in the condition in which triazine link represented by general formula (2) is formed.

General formula (2):

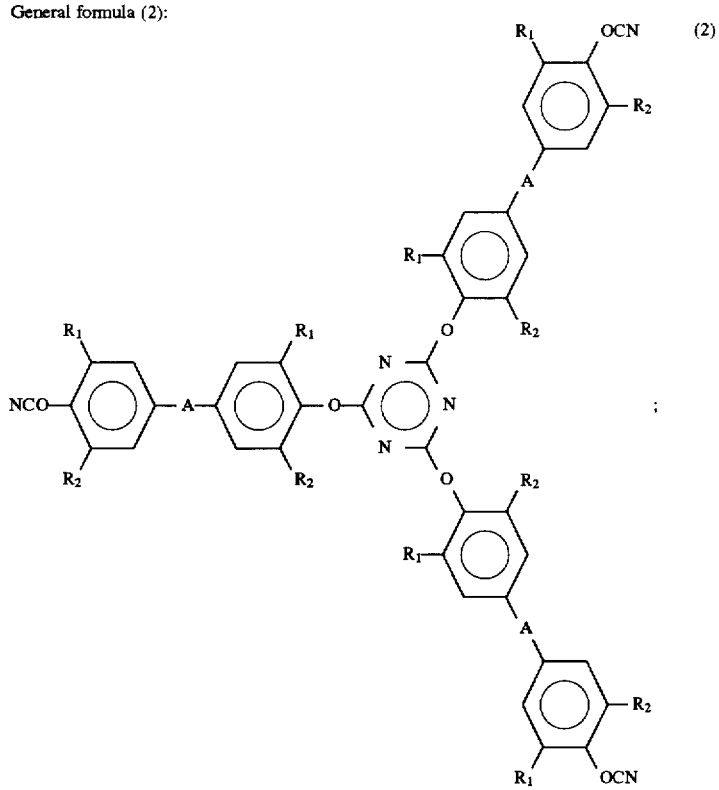

wherein $R_1$ and $R_2$ respectively designate monovalent substituent and A divalent bonding radical (including mono-union).

In aromatic cyanate resin shown by said general formula (1) or (2), $R_1$ and $R_2$ can be identical or different. $R_1$ and $R_2$ radicals are monovalent substituents exemplified by hydrogen, alkyl radical, aryl radical and halogen, etc. Cyanate resin in the case $R_1$, $R_2$ being hydrogen will be preferably used.

It is possible to use methyl radical, ethyl radical, n-propyl radical, isopropyl radical, n-butyl radical, isobutyl radical, t-butyl radical and isomar pentyl radical for alkyl radical. It is preferable to use alkyl radical of 1 to 4 of carbons, and it is more preferable to use methyl radical, ethyl radical, isopropyl radical and t-butyl radical.

It is possible to use phenyl radical, o-methyl phenyl radical, m-methyl phenyl radical, p-methyl phenyl radical, phenyl radical disubstituted by alkyl radical of 2 to 4 of carbons, 1-naphthyl radical, 2-naphthyl radical, naphthyl radical substituted by alkyl radical of 1 to 4 of carbons for aryl radical. It is preferable to use phenyl radical, phenyl radical monosubstituted by alkyl radical of 1 to 4 of carbons, and phenyl radical disubstituted by alkyl radical of 1 to 4 of carbons, phenyl radical and phenyl radical monosubstituted by methyl radical.

It is possible to use fluorine, chlorine, bromine and iodine for halogen. It is preferable to use chlorine and bromine for halogen.

To suffice component A shown in the above general formula (1) or (2), it is suggested that not only mono-union and unsubstituted methylene radical, but those radicals cited below can also be used: as methylene radicals in which one or two hydrogen atoms of methylene radical has been substituted with alkyl radical and/or aryl radical, isopropylidene radical, alkylidene radical having 2 to 10 of carbons, diphenylmethylene radical, phenyl (methyl) methylene radical, phenyl (ethyl) methylene radical, 1,1-ethylene radical, 1,1-propylene radical, and phenyl methylene radical, for example. To suffice divalent pentacyclic or hexacyclic fatty radical, 1,1-cyclopentylene radical or 1,1-cyclohexylene radical may be used. In addition, it is also preferred that sulfo-acid, divalent sulphur, divalent oxygen, divalent carbonyl radical, tetramethylxylidene radical, or phenylene radical be used. Note that tetramethylxylidene radical corresponds to benzene substituted by means of two units of isopropylidene radical.

Especially it is preferable to use cyanate resin where $R_1$ and R2 in said general formula (1) or (2) are any combination of hydrogen, alkyl radical and halogen radical, and A is any one of unsubstituted methylene radical, isopropylidene radical and oxygen.

When considered from the point of easy obtainability and low cost, it is particularly preferable to use dicyanate of bisphenol A, dicyanate of tetramethylbisphenol F, dicyanate of bisphenol C.

For the compound which contains phenol hydroxyl radical, it is preferable to use a non-volatile compound exemplified by bisphenols such as bisphenol A, bisphenol F, bisphenol S, etc. or nonyl phenols.

It is possible to use epoxy resins exemplified by bisphenol A type epoxy resin, cresol novolak type epoxy resin, phenol novolak type epoxy resin, naphthalene type epoxy resin, glycylether type epoxy resin and glycylamine type epoxy resin for epoxy resin.

It is desired that the above-referred resin components be used in the form of solvent. Any of the above-cited resin components is blended and stirred with any of those solvents cited below so that the blend solution can be adjusted to an appropriate resin content rate. The following solvents are suggested for use; acetone, methyl-ethyl ketone, toluene, chlorobenzene, trichloro ethylene, methylene chloride, methyl cellosolve, ethyl cellosolve, dimethylformamide, dimethylacetoamide, methanol, ethanol, or isopropyl alcohol. In addition, any of the above-cited solvents can also be used as organic solvent in the course of reaction for generating imide carbonate. Resin content rate of thermosetting resin composition can properly be adjusted by way of considering viscosity, dissolubility, and handling characteristic of adhesive agent. Based on the consideration of these, it is preferred that actual resin content be in a range from 5% to 60% by weight, more preferably, it should be in a range from 10% to 50% by weight.

In the case of causing cyanate resin to react with the compound comprising at least one or more than one of phenolic hydroxyl radical without presence of solvent, reacting components can be held in the state of imide carbonate by controlling reaction via the method shown below for example while paying attention to the rise of viscosity of after starting off the reaction. Any of the above-cited solvents can also be used to restrict reaction for generating imide carbonate in the absence of solvent.

In order to absorb heat generated by the reaction, sufficient cooling may be applied immediately after initiation of the reaction to permit the reaction to be discontinued as of the stage of generating imide carbonate.

It is also possible to properly constrain progress of reaction by way of mixing an appropriate amount of organic solvent in the resin component simultaneously with initiation of the reaction so that the reaction can be discontinued as of the stage of generating imide carbonate. In order to promote yield rate, it is desired that speed of feeding organic solvent to be mixed in the resin component be of maximum limit within a range enabling the reaction to be continued without obstructing progress of the reaction.

It is also possible to quickly promote reaction and discontinue it as of the stage of generating imide carbonate by way of lowering density of imide carbonate via addition of organic solvent to resin component immediately after initiation of the reaction under presence of epoxy resin.

In the course of executing reaction for synthesizing imide carbonate, after confirming that all the cyanate radicals have been converted into imide carbonate, organic solvent is added to imide carbonate to lower density of the reacted product to cause the reaction to be discontinued.

Next, in order to provide a thermosetting resin composition with heat resistant property and adhesive property, epoxy resin is added to the yielded imide carbonate, and then the blend solution is properly diluted by means of solvent and sufficiently stirred before eventually yielding the thermosetting resin composition which is one component of the laminate related to the invention.

Epoxy resin added as catalyzer before generation of imide carbonate remains without substantially being reduced even after generation of imide carbonate, and thus, remaining epoxy resin can replace part or whole of epoxy resin that should be added after termination of reaction. Accordingly, in the event that the whole amount of epoxy resin that should be combined with thermosetting resin composition is already present in the resin compound at the time of synthesizing imide carbonate, it is permissible to delete addition of epoxy resin after synthesizing imide carbonate. Either one kind or mixture of two or more than two kinds of epoxy resin may be introduced.

In addition, heat resistant resin which is another component of the laminate related to the present invention contains characteristics of glass transition temperature of 150° C. or more than 150° C. and thermal expansion coefficient of 0.4 to 3.8×10$^{-5}$ cm/cm/°C. at the temperature of 150° C.

In order to harden thermosetting resin sufficiently, temperature of at least 150° C. is required, therefore, it is required that TAG is 150° C. or more than 150° C.

Concretely polyimide resin is preferable for the above resin because of the reasons of heat resistant property, chemical resistance, mechanical characteristic, electrical characteristic and the like. For example, "Apical" (a product and a registered trade name of Kanegafuchi Chemical Industry Co., Ltd.) can be exemplified which is heat resistant polyimide resin. The heat resistant resin is used in the condition of film. It is preferable that thickness of film is 10 μm to 400 μm.

It is preferable that thermal expansion coefficient of the thermosetting resin is 0.4 to 3.8×10$^{-5}$ cm/cm/°C. at the temperature of 20° (ordinary temperature) to 150° C. The reason is that when thermal expansion coefficient is 0.4×10$^{-5}$ cm/cm/°C. or less or not less than 3.8×10$^{-5}$ cm/cm/°C., bending caused by the difference of thermal expansion is produced in the process of setting resin.

Further, when laminated with the above thermosetting resin composition, laminate obtaining excellent adhesive property and heat resistant property, and exhibiting no bending can be obtained.

In the laminate related to the present invention the thermosetting resin composition consummated via the above processes is coated on the surface of polyimide film for example. The laminate may be cured via a heating process at 150° C. for an hour. Needless to mention that heating temperature and duration are variable according to compound constituent, compound ratio, and thickness of coated film of thermosetting resin composition. When blending resin components, it is permissible to initially dilute respective resin components with solvent to generate easily manageable viscosity before implementing blending. The invention can be implemented by way of adding various improvements, changes, and modifications based on knowledge of those skilled in the art within a scope without deviating from substantial essence of the invention.

As is apparent from the foregoing description, since the inventive laminate is characterized by outstanding adhesive property, heat resistant property, and distinguished dimensional stability by virtue of minimum contraction via hardening, the inventive laminate can ideally be used for composing sealing resin for composing substrates for mounting electronic parts, solder resist, and housing-material resin for electric and electronic apparatuses and the like for example.

The invention is more concretely described below by way of citing actual examples. It should be understood however that the scope of the invention is by no means confined to the following examples. Note that terms "parts" shown in the following description indicates "parts by weight" and "IR" infrared absorbent spectrum, respectively.

The following are examples of producing the laminate related to the present invention by laminating said thermosetting resin composition and polyimide film.

EXAMPLE 1

Initially, 40 parts of tetramethyl-bisphenol F dicyanate M-30 (cyanate resin, a product of Chiba-Gaigy Japan, Ltd.), 20 parts of bisphenol A (phenolic resin), 20 parts of "Epicoat" 828 (epoxy resin, a product of Yuka-Shell Epoxy Co., Ltd.), and 40 parts of methyl ethyl ketone, were blended, and then the blended solution was sufficiently stirred and heated at 80° C. for 4 hours to implement reaction.

Next, it was confirmed via IR that cyanate radical was fully converted into imide carbonate, and then 40 parts of methyl ethyl ketone was quickly added to imide carbonate to stop reaction, and finally an imide-carbonate blended composition was yielded.

Next, 50 parts of the yielded imide-carbonate blended composition, 20 parts of "Epicoat" 1001 (epoxy resin, a product of Yuka Shell Epoxy Co., Ltd.), and 50 parts of methyl ethyl ketone, were blended, and then the blended solution was sufficiently stirred before eventually yielding a thermosetting resin composition.

Then, the yielded thermosetting resin composition was uniformly coated on the surface of polyimide film "Apical" (a product and a registered trade name of Kanegafuchi Chemical Industry Co., Ltd.) which has a glass transition temperature of more than approximately 550° C. and a thermal expansion coefficient of $3.2 \times 10^{-5}$ cm/cm/°C. between 100° C. and 200° C. so that 15 µm of thickness could evenly be achieved, and then the coated film was heated at 150° C. for 3 hours to implement curing to produce a laminate related to the present invention. Next, bending of the coated polyimide film before and after curing was measured to evaluate hardening contraction of the thermosetting resin composition. Mean height value of a square of a sample cut out by 35 mm×40 mm of size was applied as the scale of evaluating bending. By referring to this scale, bending when the thermosetting resin composition was on the top surface was designated by minus (−), whereas bending when the polyimide film was on the top surface was designated by plus (+). In addition, in order to evaluate adhesion effect of the laminate constructed of the thermosetting resin composition and the polyimide film, thereafter the laminate coated with the thermosetting resin composition over the polyimide film was laminated with copper foil completed with surface treatment by means of silane coupling agent at 120° C. to complete sample for evaluating peeling strength between the thermosetting resin composition and the polyimide film which are elements of the laminate. Then, after preparing 1 cm-wide measurement pattern, the sample was tested to evaluate 90° peeling strength at 20° C. and 150° C. Test results are shown in Table 1.

TABLE 1

|  | Bending (mm) | Peeling Strength (kg/cm) | |
| --- | --- | --- | --- |
|  |  | 20° C. | 150° C. |
| EXAMPLE 1 | +0.1 | 1.5 | 0.9 |
| COMPARATIVE EXAMPLE 1 | −1.8 | 1.3 | 0.7 |
| COMPARATIVE EXAMPLE 2 | +1.8 | 1.2 | 0.4 |
| COMPARATIVE EXAMPLE 3 | −1.2 | 1.8 | 0.8 |

COMPARATIVE EXAMPLE 1

Initially, thermosetting resin composition was yielded by blending 60 parts of epoxy resin "Epicoat" 1001 (a product of Yuka-Shell Epoxy Co., Ltd.), 10 parts of diaminophenylsulfone serving as curing agent, and 50 parts of methyl ethyl ketone. Using the yielded thermosetting resin composition, sample of laminate was prepared in the same way as was done for the Example 1. Next, bending of polyimide film before and after curing was measured to evaluate hardening contraction of adhesive agent. Likewise, pattern for evaluating peeling strength was prepared, and then, 90° peeling strength was measured at 20° C. and 150° C. Test results are also shown in Table 1.

COMPARATIVE EXAMPLE 2

Initially, a thermosetting resin composition was yielded by blending 50 parts of the imide carbonate blended composition formulated as per the Example 1, and 50 parts of methyl ethyl ketone. Using the yielded thermosetting resin composition, a sample of laminate was prepared in the same way as was done for the Example 1. Next, bending of polyimide film before and after curing was measured to evaluate hardening contraction of adhesive agent. In addition, pattern for evaluating peeling strength was prepared, and then, 90° peeling strength was measured at 20° C. and 150° C. Test results are also shown in Table 1.

COMPARATIVE EXAMPLE 3

Initially, a thermosetting resin composition was yielded by blending 40 parts of tetramethylbisphenol F dicyanate M-30 (a product of Chiba-Gaigy Japan, Ltd.), 20 parts of "Epicoat" 1001 (a product of Yuka-Shell Epoxy Co., Ltd.), and 50 parts of methyl ethyl ketone. Using the yielded thermosetting resin composition, a sample of laminate was prepared as was done for the Example 1. Next, bending of polyimide film before and after curing was measured to evaluate hardening contraction of adhesive agent. In addition, pattern for evaluating peeling strength was prepared, and then, 90° peeling strength was measured at 20° C. and 150° C. Test results are shown Table 1.

From the above examples it can be known that laminate comprising least thermosetting resin composition and heat resistant resin which has glass transition temperature of 150° C. or more than 150° C. and thermal expansion coefficient of 0.4 to 3.8×10–5 cm/cm/°C. at the temperature of 20° (ordinary temperature) to 150° C. has excellent heat resistivity and adhesiveness, and laminate of small bending can be obtained.

What is claimed is:

1. Laminate comprising at least the following two components:

(1) a thermosetting resin composition comprising an imide carbonate synthesized by reacting a cyanate resin and a compound containing at least one phenolic hydroxyl radical, said reaction being conducted in the presence of an epoxy resin and being stopped upon confirmation of complete conversion of cyanate to imide carbonate, wherein the epoxy resin remains unreacted; and (2) a resin having a glass transition temperature of 150° C. or more and a thermal expansion coefficient of 0.4 to $3.8 \times 10^{-5}$ cm/cm/°C. at a temperature of 20° to 150° C.

2. The laminate of claim 1, wherein in step (a) additional epoxy resin is added to the thermosetting resin composition after synthesis of the imide carbonate is complete.

3. A laminate obtained by:

(1) synthesizing an imide carbonate by blending a cyanate resin, a compound having at least one phenolic hydroxyl radical, and an epoxy resin, and heating;

(2) terminating synthesis of the imide carbonate after confirming complete conversion of cyanate to imide carbonate, wherein the epoxy resin remains unreacted, to provide a thermosetting resin composition;

(3) coating said thermosetting resin composition onto the surface of a resin having a glass transition temperature of 150° C. or more and a thermal expansion coefficient of 0.4 to $3.8 \times 10^{-5}$/cm/cm/°C. at a temperature of 20° to 150° C.; and (4) hardening.

4. A laminate obtained by:

(1) synthesizing an imide carbonate by heating a cyanate resin and a compound containing at least one phenolic hydroxyl radical in the presence of an epoxy resin, and terminating the reaction after confirming complete conversion of cyanate to imide carbonate, wherein the epoxy resin remains unreacted;

(2) blending additional epoxy resin with the imide carbonate produced in step (1) to provide a thermosetting resin composition;

(3) coating the thermosetting resin composition onto the surface of a resin having a glass transition temperature of 150° C. or more and a thermal expansion coefficient of 0.4 to $3.8 \times 10^{-5}$/cm/cm/°C. at a temperature of 20° to 150° C.; and (4) hardening.

* * * * *